United States Patent [19]
Saxton

[11] Patent Number: 5,626,083
[45] Date of Patent: May 6, 1997

[54] RAILROAD CAR WITH LIGHTWEIGHT CENTER BEAM STRUCTURE

[75] Inventor: Gregory J. Saxton, Portland, Oreg.

[73] Assignee: Gunderson, Inc., Portland, Oreg.

[21] Appl. No.: 655,861

[22] Filed: May 31, 1996

[51] Int. Cl.⁶ ....................................... B61D 17/00
[52] U.S. Cl. ................... 105/355; 105/411; 105/416; 105/404
[58] Field of Search ................. 105/355, 396, 105/404, 407, 411, 416, 418

[56] References Cited

U.S. PATENT DOCUMENTS

| | | |
|---|---|---|
| 2,839,328 | 6/1958 | Prickett et al. ............... 296/28 |
| 2,940,402 | 6/1960 | Hansen et al. |
| 2,996,020 | 8/1961 | Udstad . |
| 3,159,112 | 12/1964 | Tomlinson . |
| 3,230,900 | 1/1966 | Ruprecht et al. |
| 3,244,120 | 4/1966 | Taylor ........................ 105/414 |
| 3,675,592 | 7/1972 | Bateson et al. |
| 3,677,193 | 7/1972 | Pringle . |
| 3,690,272 | 9/1972 | Ogle et al. |
| 3,734,031 | 5/1973 | Wagner . |
| 4,024,821 | 5/1977 | Yang ........................... 105/411 |
| 4,079,676 | 3/1978 | Miller ......................... 105/411 |
| 4,082,045 | 4/1978 | McNally et al. ............. 105/411 |
| 4,373,447 | 2/1983 | Pfister ......................... 105/399 |
| 4,543,887 | 10/1985 | Baker .......................... 105/355 |
| 4,681,041 | 7/1987 | Harris et al. ................ 105/355 |
| 4,753,175 | 6/1988 | Harris et al. ................ 105/355 |
| 4,784,067 | 11/1988 | Harris et al. ................ 105/355 |
| 4,802,420 | 2/1989 | Butcher et al. .............. 105/355 |
| 4,951,575 | 8/1990 | Dominguez et al. ........ 105/416 |
| 5,088,417 | 2/1992 | Richmond et al. .......... 105/411 |

*Primary Examiner*—S. Joseph Morano
*Attorney, Agent, or Firm*—Chernoff, Vilhauer, McClung & Stenzel

[57] ABSTRACT

A railroad freight car of the center beam type, in which the upright center beam has a top chord interconnected with a bulkhead at each end of the body of the car, and spaced-apart upright columns and diagonal structural members interconnect the top chord with the center sill of the car body. At each end of the center beam an upper end of a diagonal bulkhead brace included in the center beam is attached to the bulkhead at an intermediate height, and a lower end is attached to the center sill adjacent one of the columns. There is no solid plate extending from the top chord to the center sill and from the bulkhead toward the other end of the car. In one version of the car a second diagonal bulkhead brace extends upward from a location at an intermediate height on the bulkhead to the top chord.

7 Claims, 9 Drawing Sheets

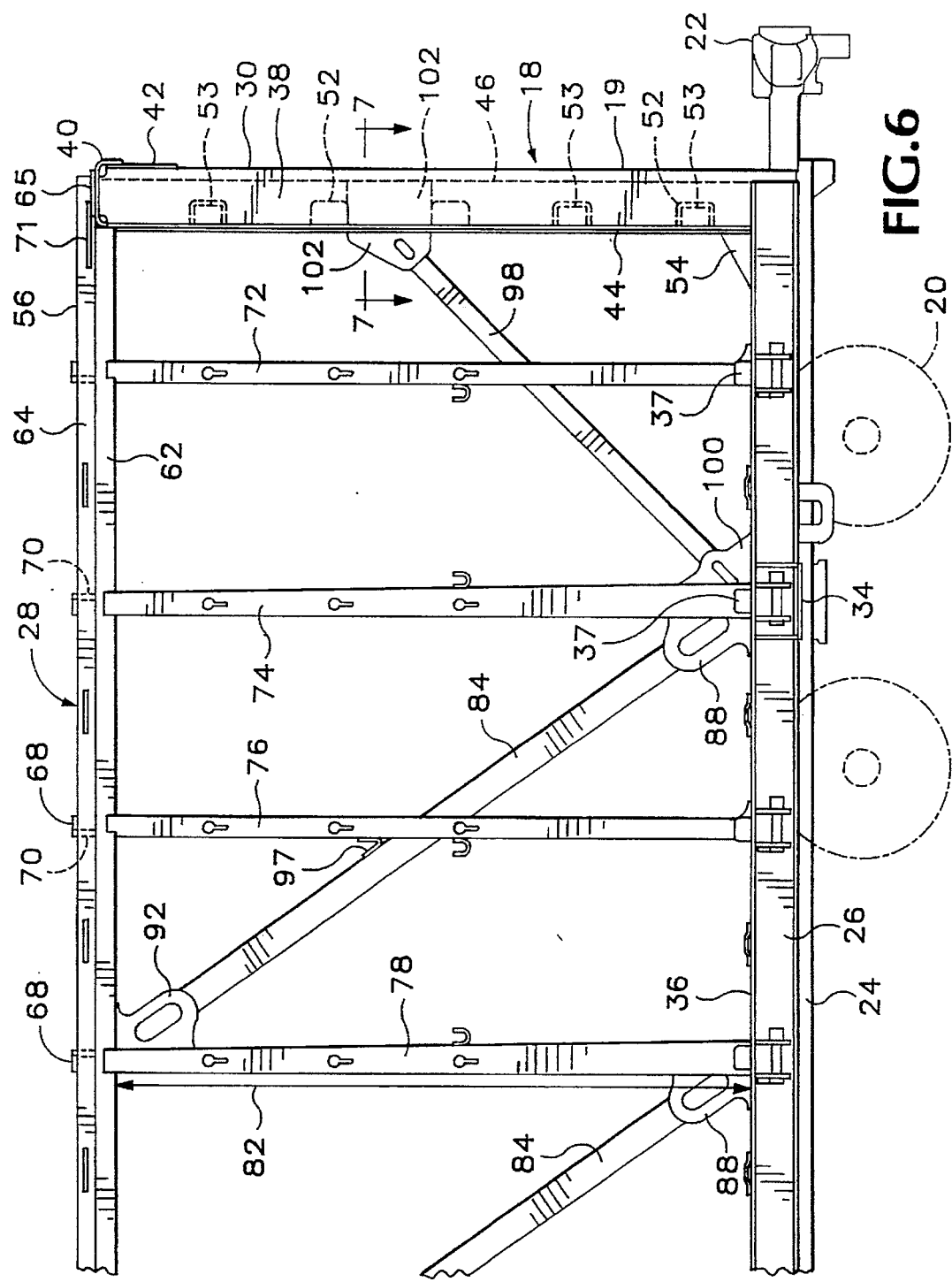

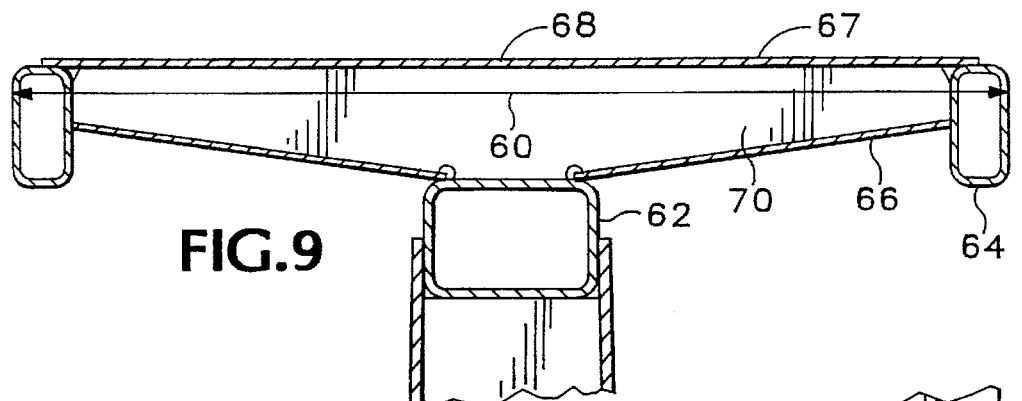
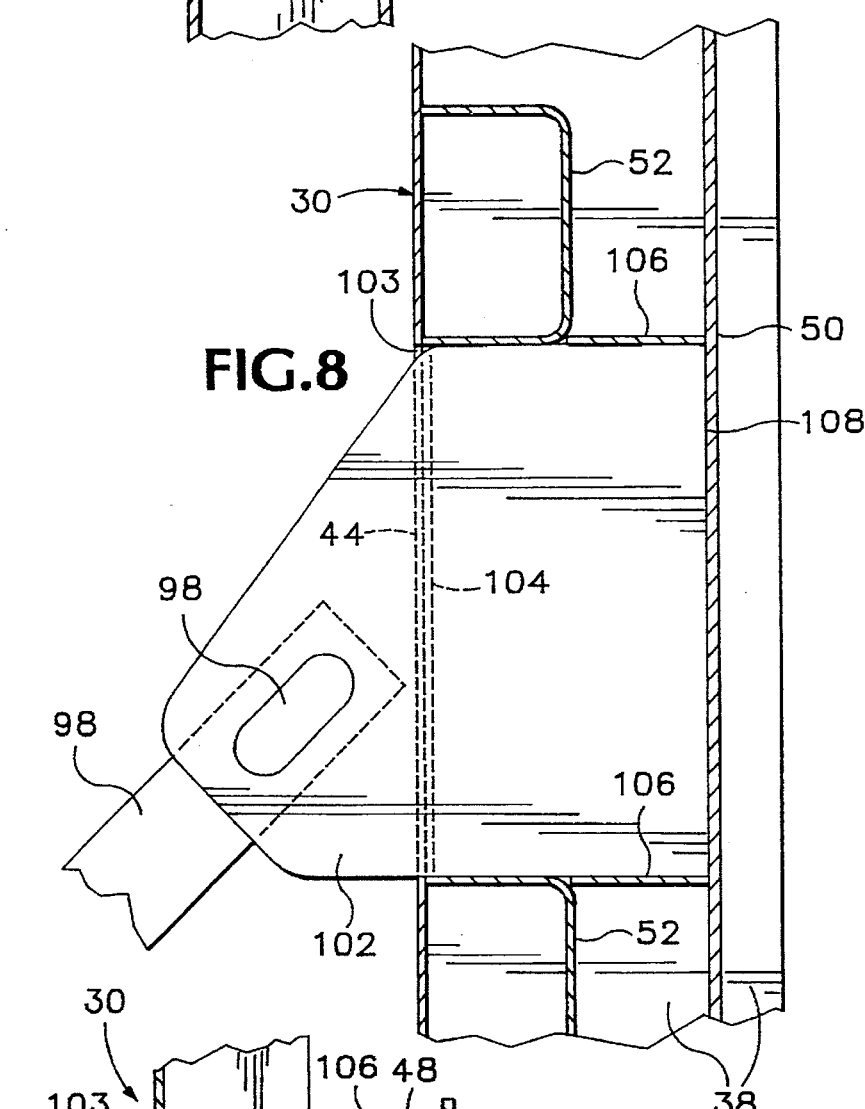
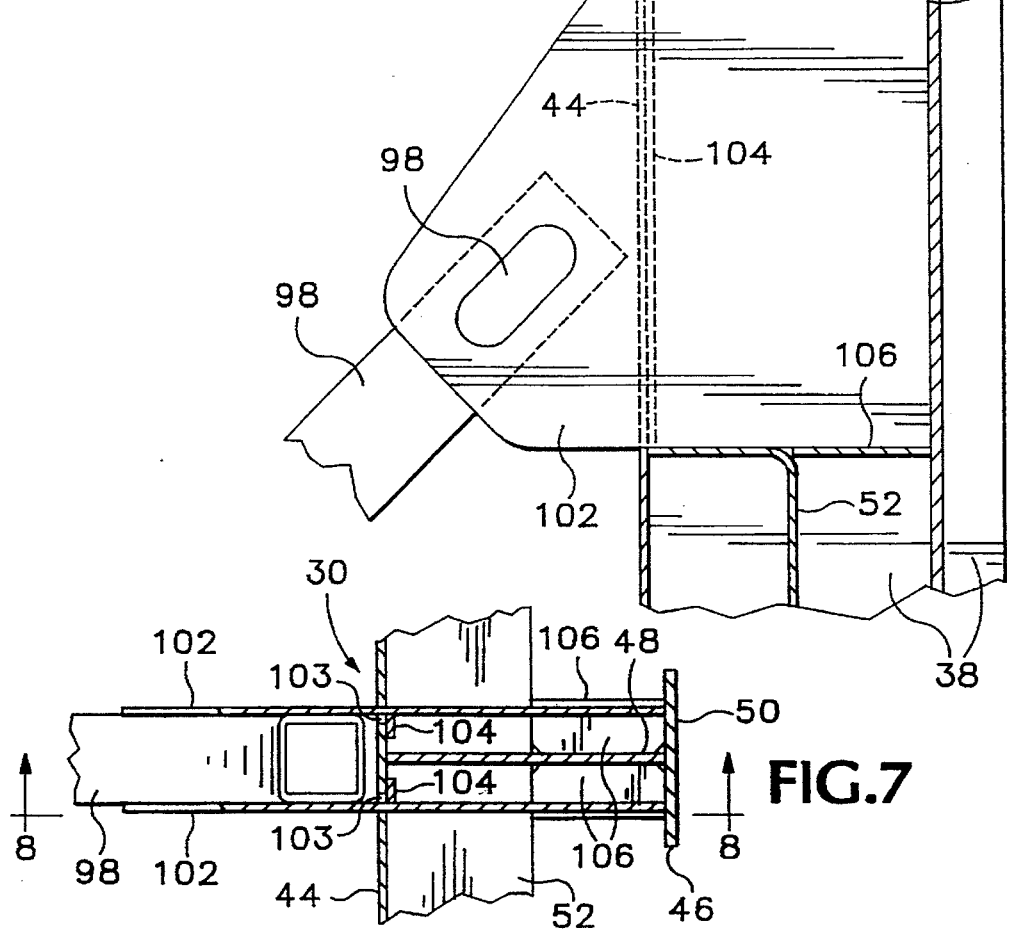

RAILROAD CAR WITH LIGHTWEIGHT CENTER BEAM STRUCTURE

BACKGROUND OF THE INVENTION

The present invention relates to railroad freight cars and in particular to cars of the type incorporating a tall center beam structure extending along the length of the car body between a pair of bulkheads located at the ends of the car body.

Center beam railroad cars have been used for the past three decades to carry materials such as lumber and sheets of building material which can be contained in packages of uniform size and shape. Such railroad cars have repeatedly been redesigned in attempting to reduce tare weight yet provide ample strength to resist dead weight forces of lading as well as the dynamic forces produced by movement of such a car as a part of a train. Lighter weight in such cars advantageously allows carriage of additional revenue-bearing cargo while the laden car remains within limits on the maximum loading which can be imposed on the rails. Additionally, a lighter car requires less fuel when being moved unladen.

Various stages of development of such center beam cars are represented in prior art patents such as Wagner U.S. Pat. No. 3,734,031, Baker U.S. Pat. No. 4,543,887, Harris et al. U.S. Pat. No. 4,681,041, and Butcher et al. U.S. Pat. No. 4,802,420. The cars disclosed in these patents all include bulkheads at the opposite ends of a car body and an upright longitudinally-oriented center beam including the center sill of the car body, a top chord interconnecting the tops of the bulkheads, and a vertical structure interconnecting the center sill with the top chord along the length of the car body. In such previously known center beam cars a rigid vertical plate is attached to the bulkhead at each end of the car body and extends longitudinally toward the opposite end as part of the center beam. Such a vertical plate extends the entire length of the car in earlier center beam car designs, but in later center beam designs portions of the vertical plate were omitted, as shown in the Baker, Harris et al., and Butcher et al. patents mentioned above. It was still thought to be necessary to provide at least a short vertical plate, immediately adjacent the bulkhead, as shown in Butcher et al., to interconnect the bulkhead with the center beam rigidly and with enough strength to transfer loads from the upper portions of the center beam through the bulkhead to the center sill of the car, even though the weight of such a vertical plate was recognized as imposing a penalty on car lading capacity.

What is desired, then, is an improved center beam car of lighter weight than previously has been thought practical, yet which has ample strength to withstand the forces imposed by greater weights of lading than could be carried safely by previously-known cars.

SUMMARY OF THE INVENTION

The present invention improves upon the prior art by providing a center beam car constructed to have ample strength with a lighter weight than was previously thought possible. A center beam car according to the present invention includes a center sill extending the length of the body, a top chord extending parallel with and upwardly spaced apart from the center sill, upright columns interconnecting the center sill and the top chord, and an elongate diagonal structural bulkhead brace member having one end interconnected with one of the bulkheads at an intermediate height between the center sill and the top chord and another end interconnected with the center sill at a location spaced apart from that bulkhead. In one embodiment of the invention the lower end of the diagonal bulkhead brace member is connected with the center sill of the car adjacent one of the columns which extends upwardly above the location of a truck supporting the body of the car.

In another embodiment of the invention a pair of diagonal bulkhead braces extend away from the bulkhead at respective intermediate heights between the top chord and the center sill, with one of those diagonal bulkhead brace members extending diagonally upward to the top chord and the other extending diagonally downward to the center sill of the car body.

In one embodiment of the invention the ends of each diagonal bulkhead brace member are attached to the bulkhead, top chord, or center sill by being welded in place between a respective pair of attachment plates.

The use of diagonal structural members as bulkhead braces interconnecting the bulkhead with the center sill or the top chord creates a structural interconnection of the bulkhead with the center sill and top chord of the center beam which provides the needed strength and rigidity in the car body without the inclusion of the vertical plate whose weight reduced the potential cargo-carrying capacity of prior art center beam cars.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 6 is a side elevational view of a portion of the railroad car shown in FIG. 1.

FIG. 7 is a sectional view of a detail of the railroad car shown in FIG. 1, taken along line 7—7 of FIG. 6.

FIG. 8 is a sectional detail view of a portion of the railroad car shown in FIG. 1, taken along line 8—8 in FIG. 7.

FIG. 9 is a sectional view taken along line 9—9 of FIG. 2, at an enlarged scale.

DETAILED DESCRIPTION OF THE INVENTION

Figure 1:
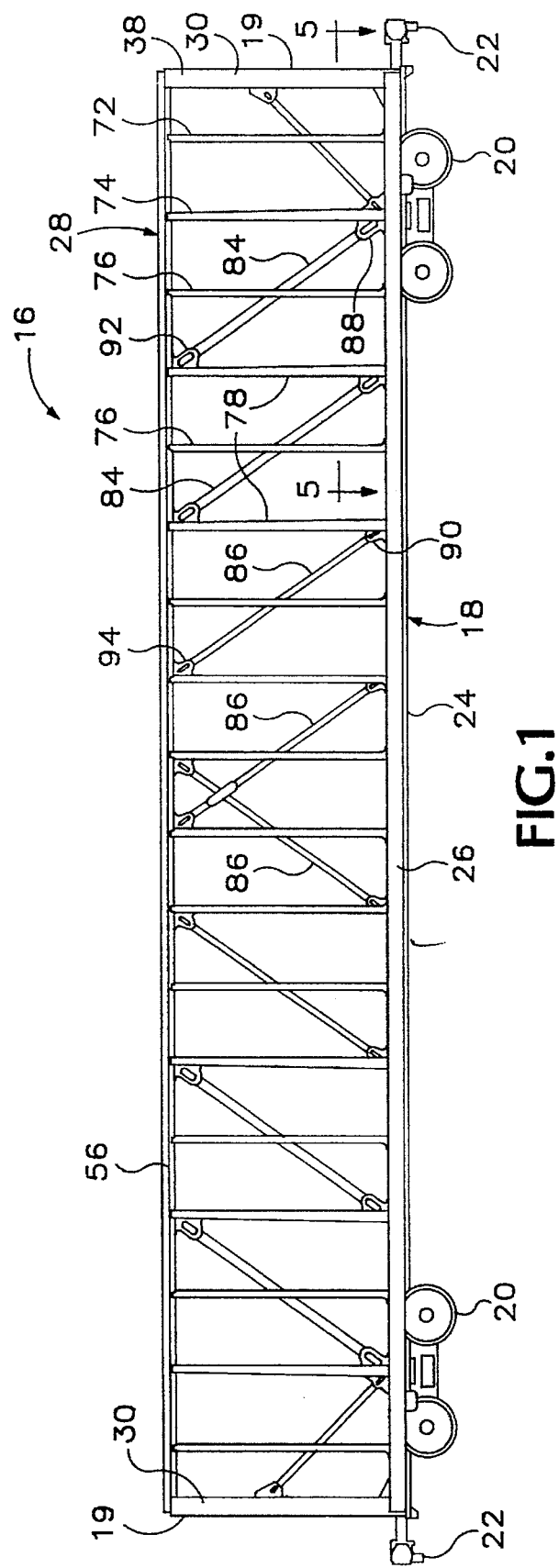
FIG. 1 is a side elevational view of a railroad car including a lightweight center beam structure and embodying the present invention.
Figure 2:
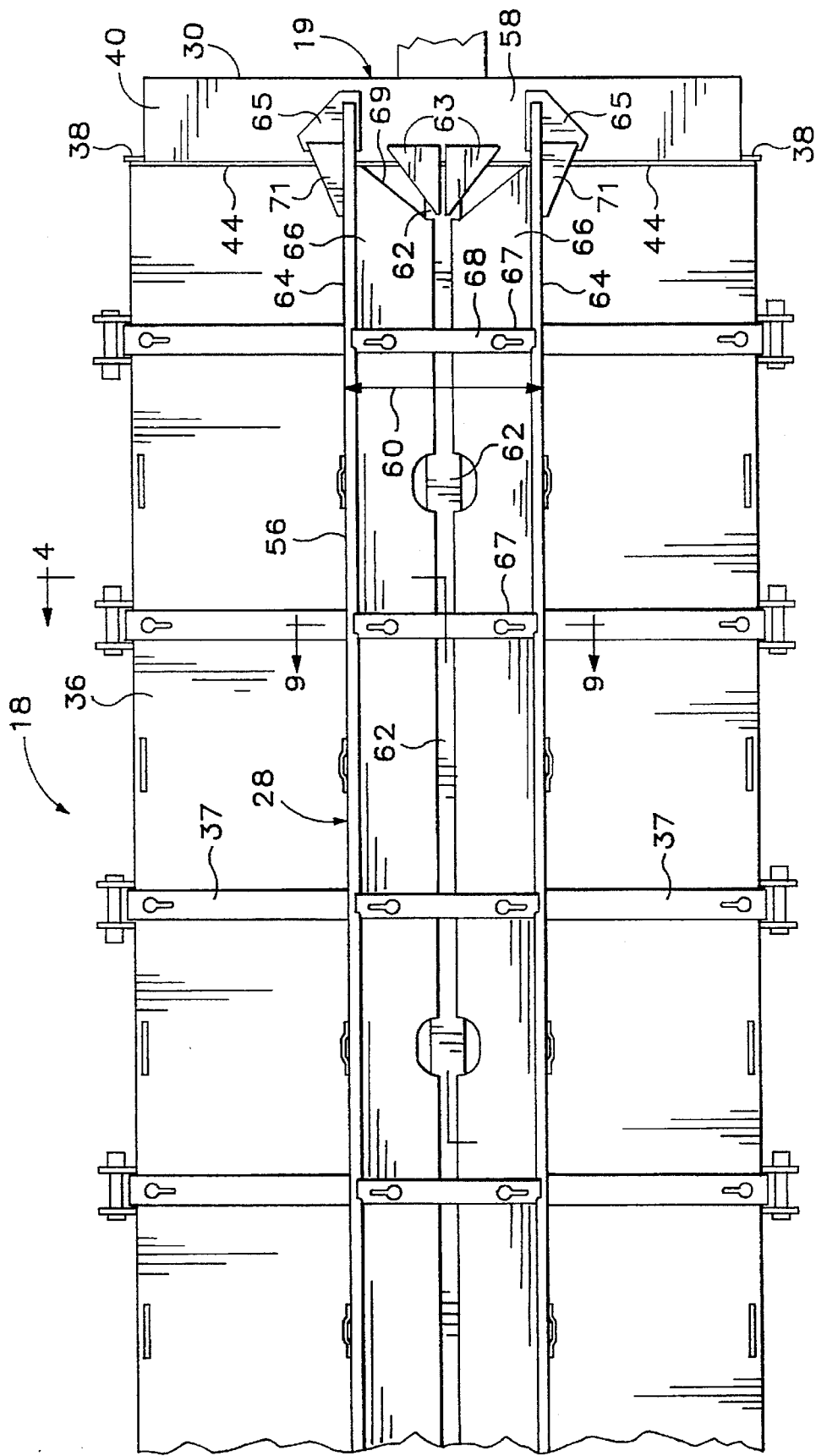
FIG. 2 is a somewhat simplified top plan view of a portion of the railroad car shown in FIG. 1, at an enlarged scale.
Figure 3:
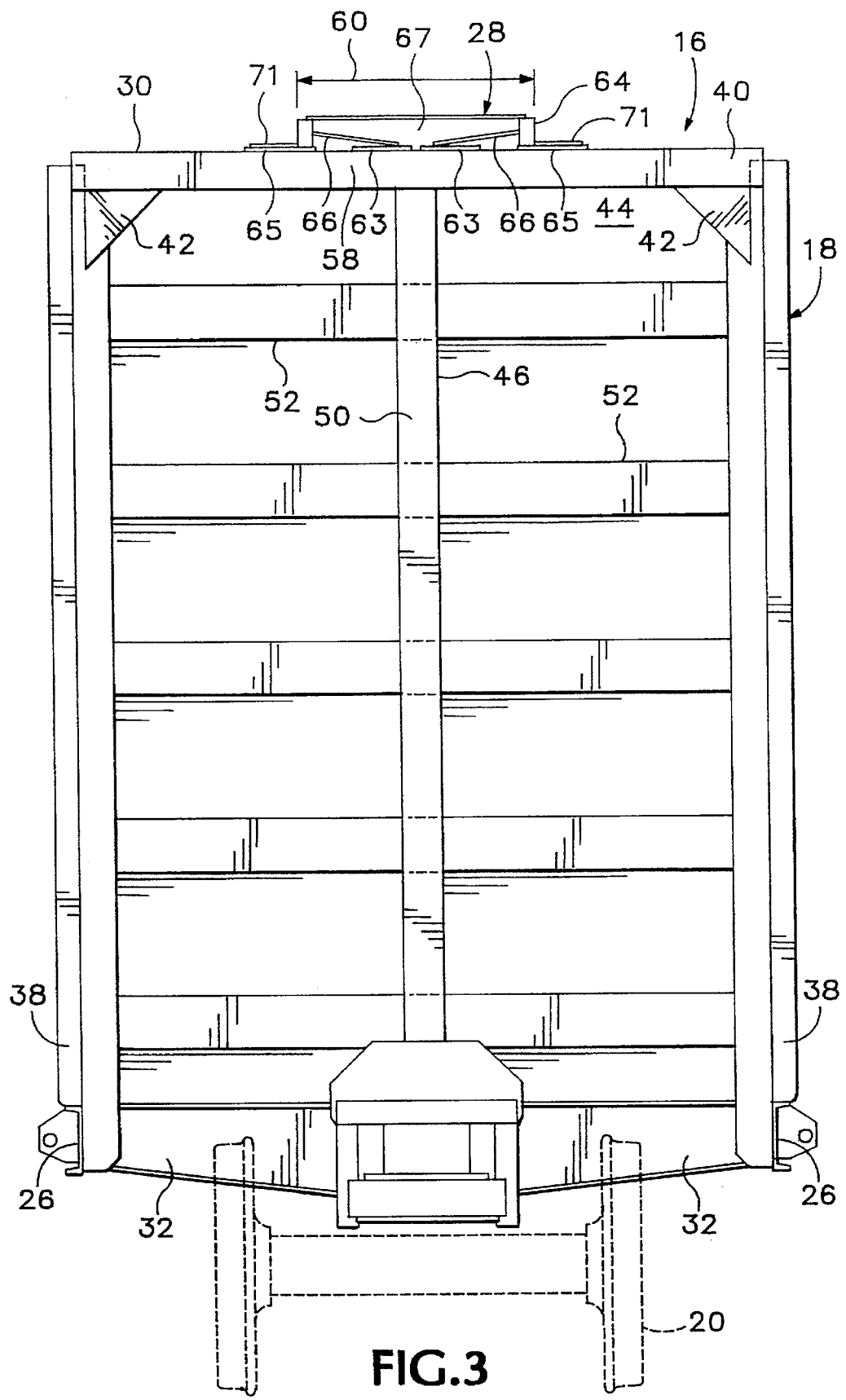
FIG. 3 is a somewhat simplified end elevational view of the railroad car shown in FIG. 1.
Figure 4:
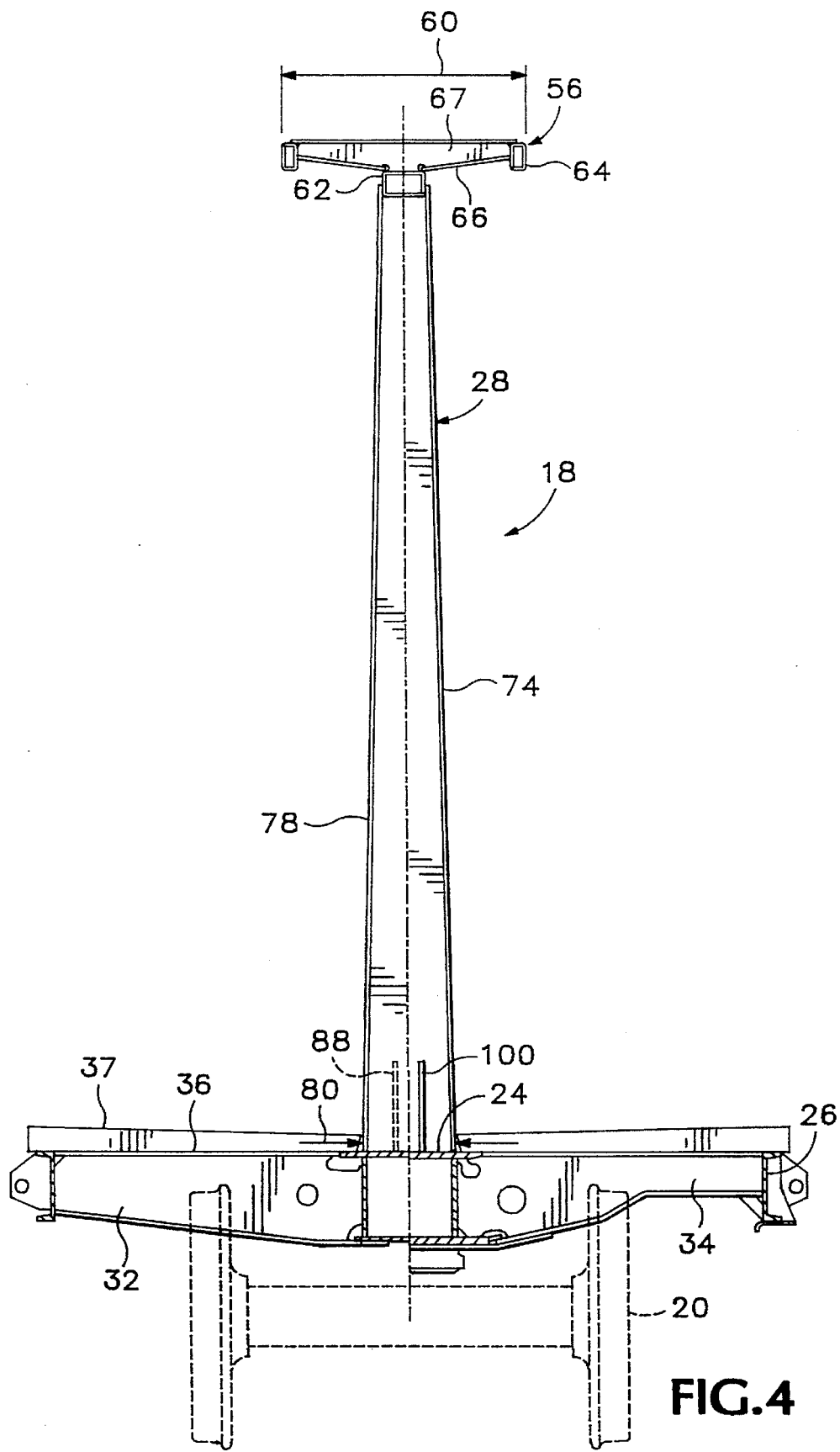
FIG. 4 is a sectional view taken along line 4—4 of FIG. 2, showing the configuration of a body bolster, a central column, and a cross-bearer of the railroad car shown in FIG. 1.

Referring now to the drawings which form part of the disclosure herein, in FIG. 1 a center beam railroad freight car 16 includes a car body 18 having a pair of opposite ends 19. The car body 18 is constructed largely of structural steel tubing and sheet steel and carried on a pair of conventional wheeled trucks 20, and includes a conventional coupler 22 at each end 19. Customary accessories such as ladders, brake hand wheels, and the like ordinarily present on a railroad car are not shown in FIG. 1, for the sake of clarity and simplicity.

The railroad car 16 includes a longitudinally extending center sill 24 and a pair of side sills 26 extending longitudinally of the car body 18 on either side of the center sill 24. A center beam structure 28 extends upward above the center sill 24 and extends longitudinally of the car body 18 between a pair of upright transversely extending bulkheads 30 located at the opposite ends 19.

Referring also to FIGS. 2, 3, 4, and 5, cross-bearers 32 extend laterally from the center beam 28 to the side sills 26 on either side of the center sill 24 at regular intervals along the length of the car body 18, except at the location of each of the trucks 20, where a body bolster 34 of more substantial structure extends transversely on either side of the center sill 24 to the respective side sill 26. Atop the cross-bearers 32 and body bolsters 34 is a floor sheet 36 extending the length of the car on each side of the center beam 28, closing the spaces between the center sill and side sills and interconnecting the cross-bearers 32 and body bolsters 34. Risers 37, which are channels of formed steel sheet with tapered flanges, are located atop the floor sheet 36, above and aligned with the cross bearers 32 and body bolsters 34. Additional risers 37 are also located at intervals along the length of the car body 18 in locations where there are no cross bearers 32 nor bolsters 34. These additional risers 37 are supported by flat bar reinforcing members (not shown) attached to the floor sheet 36. The risers 37 each provide a cargo-supporting top surface sloped slightly toward the center beam 28.

The bulkheads 30 at the ends 19 of the car body 18 are both of similar construction including a pair of vertically-extending Z-shaped corner post members 38 of formed plate, each corner post 38 having its bottom end attached to the respective side sill 26. A transverse horizontal top channel member 40 of formed steel extends between and interconnects the tops of the corner posts 38. Gussets 42 provide reinforcement. A face sheet 44 is located on the inner side of the bulkhead 30, facing toward the opposite end 19 of the car body 18. A central vertical stiffener 46 is of "T" shape in section, extending from the center sill to one flange of the horizontal channel member 40, with a web plate 48 forming the stem of the "T" welded to and extending vertically along the outer side of the face sheet 44. A separate chord plate 50 is welded to the plate 48, forming the cap of the "T".

The face sheet 44 is reinforced by horizontal stiffener members 52 such as formed channels arranged with the legs of the channels abutted against the face sheet 44. The reinforcing horizontal channel members 52 extend over the full width of the bulkhead 30 between the corner posts 38, and are spaced vertically apart from one another along the face sheet 44, to which they are welded. Cutouts for the horizontal stiffeners 52 are provided in the web plate 48 of the T-shaped central vertical stiffener 46, and small filler diaphragms 53 of the same thickness as the web plate 48 are welded inside some of the channels 52, in line with the web plate 48, as shown. An upright triangular gusset 54 is located on the center line of the car body, aligned with the stem 48 of the vertical stiffener 46 and extending longitudinally toward the opposite end of the car from a lower portion of each bulkhead 30. The gusset 54 is fastened to the top of the center sill 24 to carry stresses between the base of the bulkhead 30 and the center sill.

At the top of each bulkhead 30 a top chord 56 which is part of the center beam 28 is attached to a laterally central portion 58 of the top of the bulkhead 30. The top chord 56 has a width 60 of 34 inches, for example, and extends for the entire length of the car body 18 to the bulkhead 30 at the opposite end 19. The top chord 56 includes a central member 62, which may be of rectangular steel tube, and a pair of longitudinally extending tubular steel side members 64 interconnected with the central member 62 by sloping sheets 66. Transverse members 67, spaced apart along the length of the top chord 56, are formed of sheet steel and include a horizontal transverse portion 68 welded to each of the side members 64, and a vertical transverse portion 70 welded to each of the side members 64 and to the sloping sheets 66 and the central member 62.

The central member 62 abuts against and is welded to a flange of the horizontal top channel 40. Each of the side members 64 extends above the top channel 40 and is welded to a mounting plate 65 welded, in turn, to the top channel 40. The sloping sheets 66 are cut away, as shown best at 69 in FIG. 2, and a pair of triangular gussets 63 interconnect the top of the central member 62 with the top of the horizontal top channel 40 of the bulkhead 30. Another pair of gussets 71 connect the two side members 64 to the plates 65.

Figure 5:
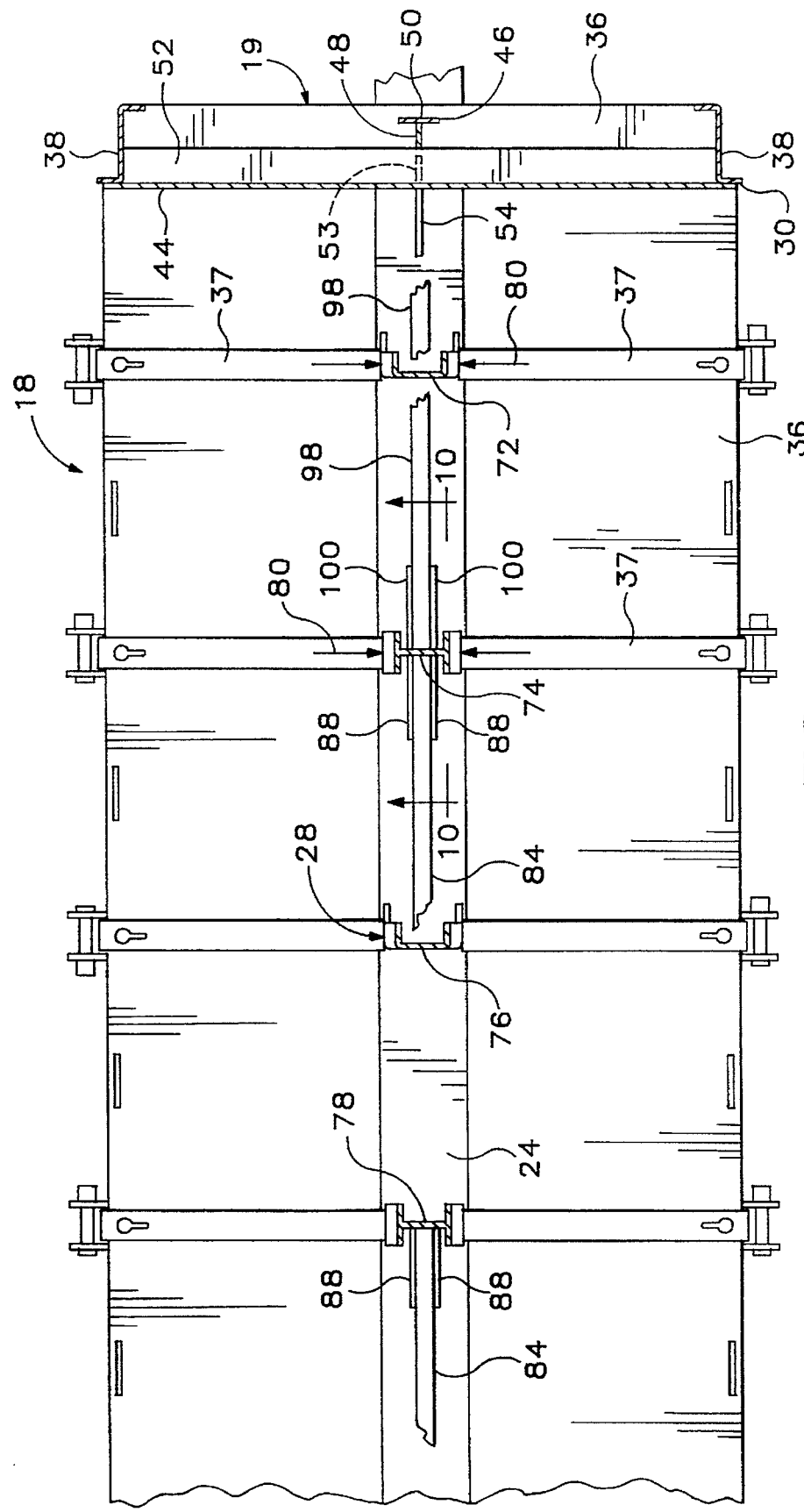
FIG. 5 is a sectional view of a portion of the railroad car shown in FIG. 1, taken along line 5—5.

Interconnecting the center sill 24 with the top chord 56 are several upright center columns including a column 72 of formed sheet, which is closest to the bulkhead 30 at each end 19 of the car. A somewhat larger column 74 is located above each body bolster 34 and may be constructed as a weldment of a transverse plate and a pair of longitudinally extending plates, arranged in the shape of a capital "H" as seen in section (FIG. 5). Several additional small columns 76 are of formed plate construction similar to that of columns 72, and several additional large columns 78 are similar to the columns 74. All of the columns 72, 74, 76, and 78 are tapered from a greatest width 80 at the lower end of each, which is welded to the center sill 24, to a minimum width at the upper end of each, as may be seen in FIG. 4. The upper end of each of the columns 72, 74, 76, and 78 is attached to the central member 62 of the top chord 56, preferably by welding a pair of included flanges of each column to the respective sides of the central member 62. The locations of the cross-bearers 32 and body bolsters 34 coincide with the locations of respective columns 74 and 78 spaced apart longitudinally of the car body 18 at center-to-center distances of, for example, 96 inches while the columns 72 and 76 are spaced apart from the nearest column 74 or 78 by a center-to-center distance of, for example, 48 inches, and are aligned with respective ones of the risers 37. Each of the central columns 72, 74, 76, and 78 may have a height 82 of about 136 inches, for example, to the bottom of the center member 62 of the top chord 56.

Figure 11:
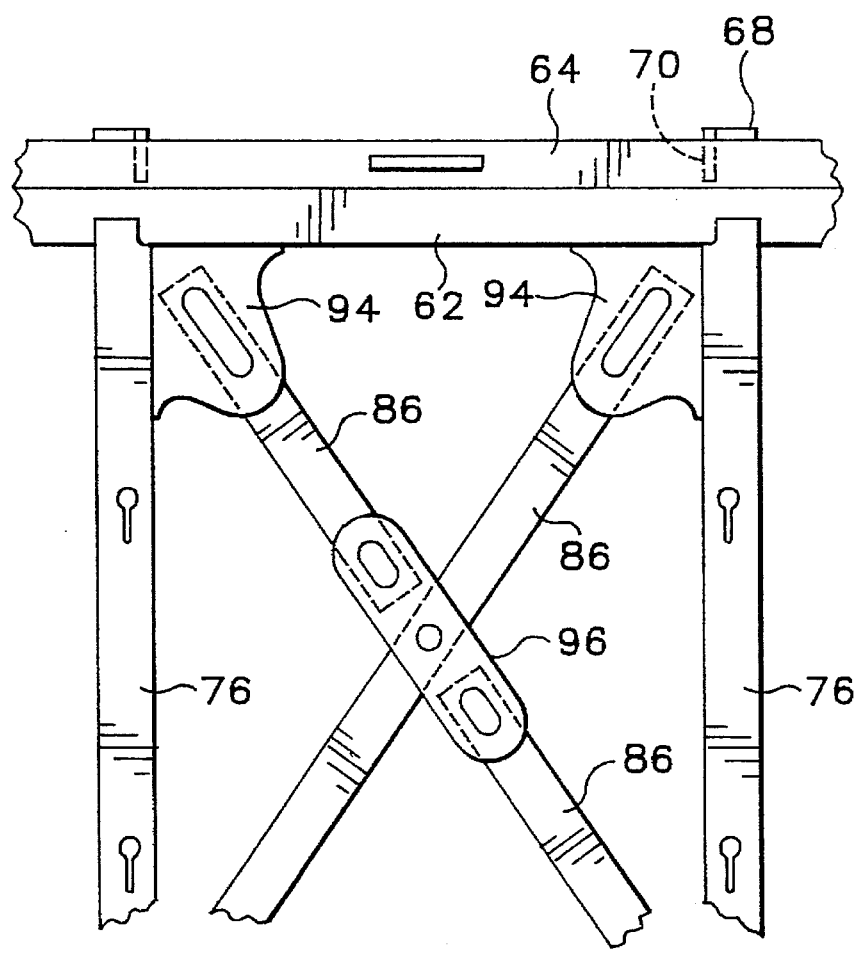
FIG. 11 is a detail view, at an enlarged scale, showing a pair of crossed diagonal members of the center beam structure of the car shown in FIG. 1.

Spaced apart longitudinally along the center beam 28 are diagonal structural members 84 and 86 each having a lower end attached to a respective one of the central columns 74 and to the center sill 24 by respective pairs of attachment plates 88, 90, and each having an upper end attached to a respective one of the central columns and to the central member 62 of the top chord 56 by a respective pair of attachment plates 92, 94. The lower end of each of the diagonal members 84 and 86 is closer to the nearer end 19 of the car body than is the upper end. The diagonal members 84 and 86 may be of rectangular tubular steel construction, and the diagonal members 84 are larger than the diagonal members 86, in order to carry the larger forces encountered at their locations. Two of the diagonal members 86 cross each other at the middle of the length of the car body 18, where one of the diagonal members 86 is interrupted, and the two are interconnected by a pair of connector plates 96, shown in greater detail in FIG. 11. A central portion of each of the diagonal members 84 and 86 passes through an aperture defined in a respective one of the columns 76, and a V-shaped strap 97 has one leg welded to the respective diagonal member 84 or 86 and another leg welded to the respective column 76, to provide a measure of support to the middle of the diagonal member 84 or 86 yet allow some movement relative to the column 76.

Figure 10:
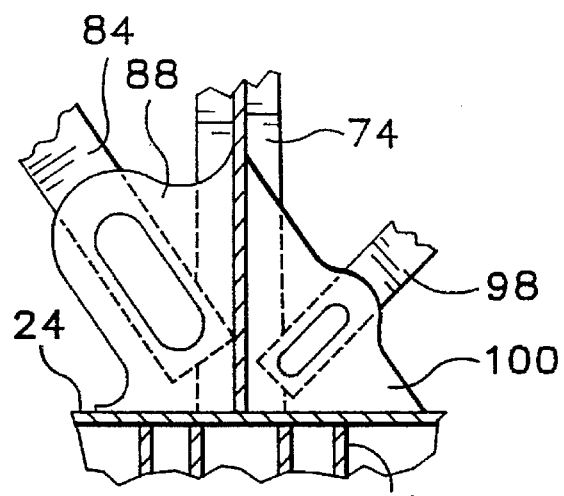
FIG. 10 is a sectional view taken along line 10—10 of FIG. 5, at an enlarged scale.

At each end of the car body 18, extending between the respective bulkhead 30 and the column 74 located above the body bolster 34 located closer to the respective end 19, is a short diagonal bulkhead brace structural member 98 shown best in FIG. 6. A suitable diagonal bulkhead brace member 98 may be of rectangular tubular steel material, for example 4 inches×3 inches in size, with a 5/16-inch wall thickness. As seen best in FIG. 10, a lower end of the diagonal bulkhead brace member 98 is attached to the top of the center sill 24 and to the column 74, in a lower interior corner located in the intersection of the column 74 with the center sill 24, by a pair of attachment plates 100, one of which is welded to each lateral side of the bulkhead brace member 98. The diagonal bulkhead brace member 98 extends diagonally upward, as part of the center beam 28, through an opening defined in the central column 72, the column closest to the bulkhead 30, and its upper end is attached to the bulkhead 30 by being welded between a pair of vertically and longitudinally extending attachment plates 102.

As shown in FIGS. 7 and 8, the attachment plates 102 are welded to the face sheet 44 of the bulkhead 30, extending through slots 103 slightly wider than the thickness of each attachment plate 102, defined in the face sheet 44. A pair of parallel flat backing bars 104 are welded alongside the attachment plates 102 on the opposite, outer, side of the face sheet 44, where they extend vertically and transversely of the car body 18 between the nearest ones of the horizontal channels 52 located upwardly and downwardly adjacent the location of the attachment plates 102. Once the backing bars 104 are in place the excess width of the slots 103 is welded up flush with the face sheet 44. Additional reinforcement plates 106 are oriented horizontally and extend transversely behind the horizontal channels 52. The reinforcement plates 106 are attached to the web plate 48 and chord plate 50 of the T-shaped vertical stiffener 46, securely interconnecting the top and bottom margins of the vertical reinforcement plates 102 with the vertical stiffener 46. An outer vertical margin 108 of each vertical reinforcement plate 102 is also welded to the chord member 50 of the vertical stiffener 46.

The above-described short diagonal bulkhead brace member 98 interconnecting the bulkhead 30 with the center sill 24 and the column 74 of the center beam 28, combined with the previously described attachment of the base of the bulkhead 30 to the center sill 24 and side sills 26, and the interconnection of the top chord 56 to the central portion 58 of the top of the bulkhead 30, result in a center beam 28 which is several hundred pounds lighter than the previously used center beam structure, as a result of not having any solid vertical plate filling the space defined between the bulkhead 30 and the closest center column 72, and between the center sill 24 and the top chord 56 as was used in previous center beam railroad cars.

Figure 12:
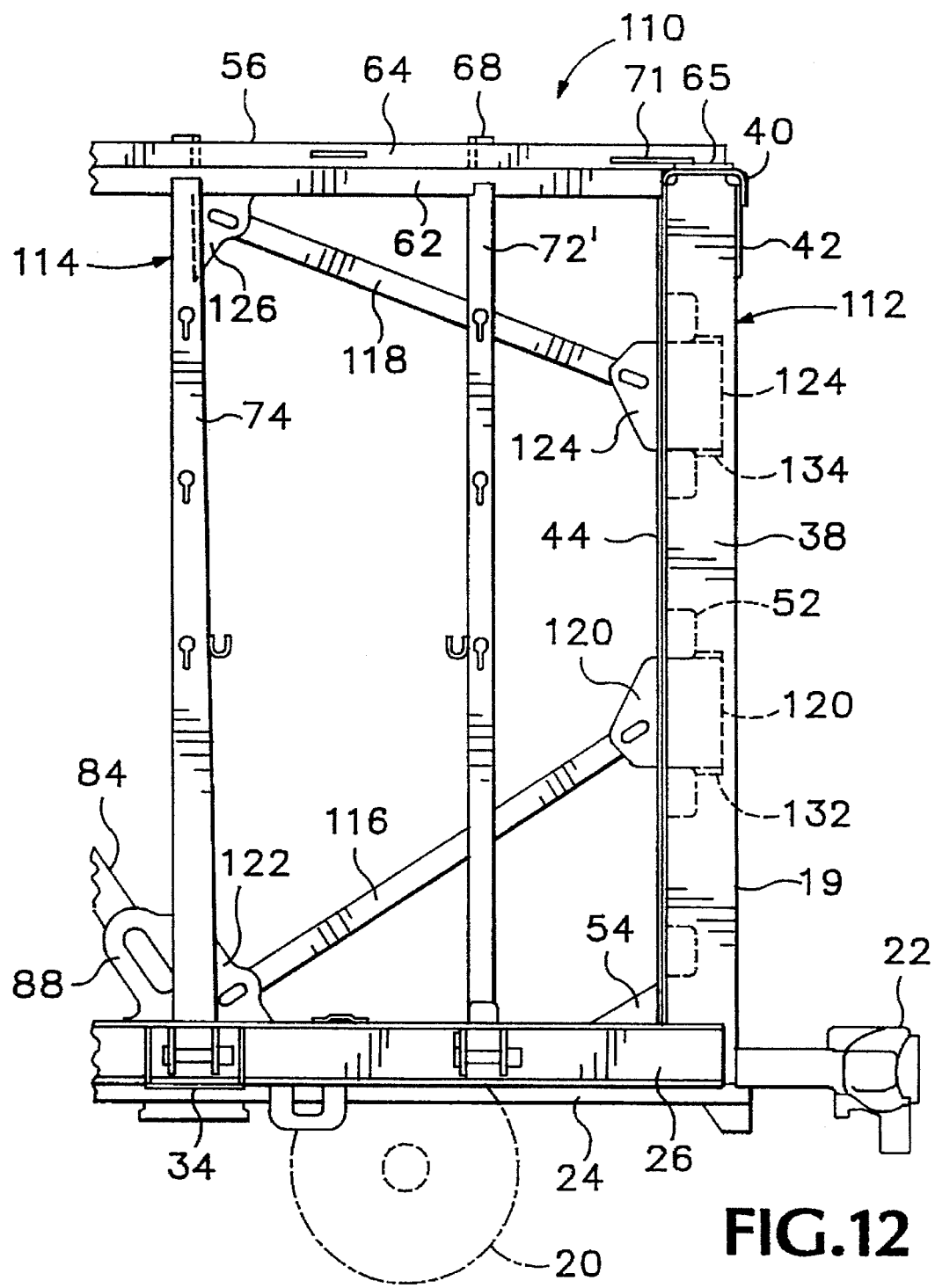
FIG. 12 is a side elevational view of a portion including one end of a railroad car which is an alternative embodiment of the present invention.

A portion of a car body 110 which is another embodiment of the present invention as shown in FIG. 12 in side elevation view. The car body 110 includes at each end 19 a bulkhead 112 which is generally of similar structure to that of the bulkhead 30. The car body 110 includes a center beam 114 similar in most respects to the center beam 28 previously described. The top chord 56 of the center beam 114 is attached to the horizontal top channel 40 of the bulkhead 112 as in the car body 18, and the base of the bulkhead 112 is attached to the center sill 24 and side sills 26 as in the car body 18. The center beam 114 includes a column 72' closest to the bulkhead 112 and a column 74 located above a body bolster 34 which rests atop a truck 20. The principal difference from the car body 18 is that a pair of short diagonal bulkhead brace members 116 and 118 extend from respective intermediate heights along the bulkhead 112 as part of the center beam 114. The lower bulkhead diagonal brace 116 extends from a respective pair of attachment plates 120 on the bulkhead 112 to a pair of attachment plates 122 in the lower interior corner formed by the center sill 24 and the column 74. The upper bulkhead diagonal brace member 118 extends from a respective pair of attachment plates 124 located on the bulkhead 112, spaced above the attachment plates 120 by a distance established by the locations of two of the horizontal stiffeners 52 of the bulkhead 112, to a respective pair of attachment plates 126 in an upper interior corner defined by the top chord 56 and the column 74. Horizontal reinforcement plates 132 and 134 correspond to the reinforcement plates 106 of the bulkhead 30. Each of the diagonal braces 116 and 118 extends through a respective aperture defined in the column 72'.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A railroad freight car, comprising:
   (a) an elongate body having upstanding transverse bulkheads located at opposite ends of said body and including a vertical center beam extending longitudinally of the car between said bulkheads, the center beam including
      (i) a center sill, extending the length of said body;
      (ii) a top chord extending parallel with and spaced upwardly apart from the center sill; and
      (iii) at each end of the car, an elongate diagonal structural member having a first end interconnected with one of said bulkheads at an intermediate height between said center sill and said top chord and a second end interconnected with said center sill at a location spaced apart from said one of said bulkheads.

2. The railroad car of claim 1 including a plurality of upright columns extending from said center sill to said top chord and spaced apart from each other longitudinally of said body, wherein one of said columns, together with said center sill, defines a base interior corner, and said second end of said diagonal structural member is interconnected with both said center sill and said one of said columns adjacent said base interior corner.

3. The railroad car of claim 2 wherein said center beam defines a space between said center sill and said top chord and between one of said bulkheads and a closest one of said upright columns and is free from any vertical longitudinal plate substantially filling said space between said center sill and said top chord and between said one of said bulkheads and said closest one of said upright columns.

4. The railroad car of claim 1, further comprising as a part of said center beam a second elongate diagonal structural member having a first end thereof interconnected with said one of said bulkheads at an intermediate height between said center sill and said top chord, and a second end thereof interconnected with said top chord at a location spaced apart from said one of said bulkheads.

5. The railroad car of claim 4 including a plurality of upright columns extending from the center sill to said top chord and spaced apart from each other longitudinally of said body, wherein one of said columns, together with said top chord, defines an upper interior corner, and wherein said second elongate diagonal structural member is interconnected with both said top chord and said one of said columns adjacent said upper interior corner.

6. The railroad car of claim 1 including a pair of side sills extending longitudinally of said car body, wherein each of said bulkheads includes a plurality of vertically apart-spaced transverse stiffening members and a centrally located upright stiffening member, said elongate diagonal structural member being interconnected with said upright stiffening member through a connecting plate.

7. The railroad car of claim 1, including a pair of trucks spaced apart longitudinally along said car body, each truck being spaced inwardly apart from a respective one of said ends, said center beam including an upright column located above one of said tracks, and said second end of said elongate diagonal structural member being interconnected with said center sill and said upright column above said one of said trucks.

* * * * *